United States Patent [19]

Mutti et al.

[11] Patent Number: 6,165,532
[45] Date of Patent: Dec. 26, 2000

[54] UHT STERILIZATION PROCESS FOR MILK-BASED PRODUCTS

[75] Inventors: Franco Mutti, Parma; Francesco Giuffredi, Madregolo di Collec chio, both of Italy

[73] Assignee: Parmalat S.p.A., Collecchio, Italy

[21] Appl. No.: 09/313,649

[22] Filed: May 18, 1999

[30] Foreign Application Priority Data

May 19, 1998 [IT] Italy ................................. MI98A1086

[51] Int. Cl.[7] ...................................................... A23C 3/00
[52] U.S. Cl. ............................................ 426/522; 426/511
[58] Field of Search .................................... 426/511, 521, 426/522, 524; 99/453; 261/118

[56] References Cited

U.S. PATENT DOCUMENTS

| | | |
|---|---|---|
| 2,975,069 | 3/1961 | Laguilharre . |
| 4,310,476 | 1/1982 | Nahra et al. ............................ 261/118 |
| 4,419,301 | 12/1983 | Nahra et al. . |
| 4,461,780 | 7/1984 | Menacci .................................. 426/522 |
| 5,639,449 | 6/1997 | Nahra et al. ............................ 426/522 |

FOREIGN PATENT DOCUMENTS

| | | |
|---|---|---|
| 968 986 | 12/1950 | France . |
| 2 561 073 | 9/1985 | France . |
| 1 367 213 | 9/1974 | United Kingdom . |

*Primary Examiner*—George C. Yeung
*Attorney, Agent, or Firm*—Jacobson, Price, Holman & Stern, PLLC

[57] ABSTRACT

A process for high-temperature sterilisation of products such as milk and the like comprises the steps of directly injecting steam into the product for heating it to a lower temperature than the sterilisation temperature, making the product stand for a definite period of time, making the product pass into an infuser to further heat it to the sterilisation temperature, keeping it to this temperature for a predetermined period of time, admitting the product to a vacuum chamber for sudden cooling of same. A plant for application of the above process therefore comprises a steam injector (12), an accumulator for product standing (13), an infuser (14) and a vacuum chamber (19), disposed in series.

9 Claims, 1 Drawing Sheet

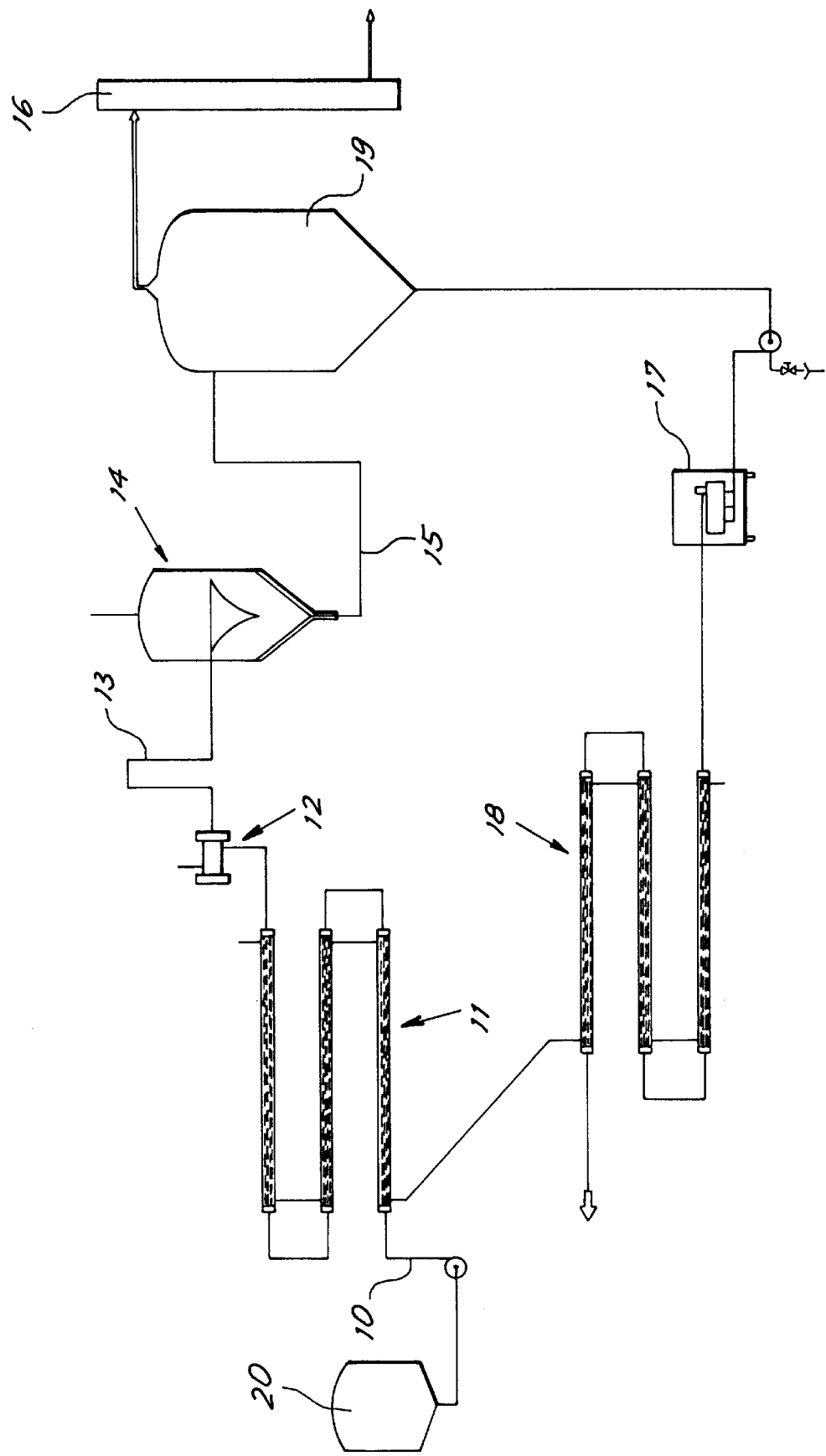

UHT STERILIZATION PROCESS FOR MILK-BASED PRODUCTS

BACKGROUND OF THE INVENTION

The present invention relates to a process and a plant for UHT sterilisation of milk-based produces.

It is known that UHT sterilisation, if followed by packaging under aseptic conditions, enables produces to be obtained that can be preserved for long periods of time at room temperature without the produce being damaged.

UHT sterilisation takes place following two main technologies: direct sterilisation by steam injection into the produce; indirect sterilisation with heat exchangers over the whole technological cycle. In the case of steam injection, it is obtained either with an injector directly admitting steam to the milk mass in transit or with an infuser, consisting of a chamber into which the milk falls forming a film while steam is being admitted to the chamber.

The direct-injection technology enables better organoleptic features to be obtained as compared with the indirect technology, and also the decay to which the produce is submitted during the sterilisation process to be reduced. On the other hand, energy and water consumption in a direct sterilisation plant is much higher than that in a corresponding indirect sterilisation plant.

The first examples applying the direct technology go back to the beginning of the sixties. In the progress of years the direct technology has evolved to obtain better performance and less waste, and different embodiments starting from the base process have been developed. In the classic technology of direct steam injection, the produce is fed to the plant at low temperature, i.e. 4–8° C. Then a pre-heating to 70–80° C. is carried out by use of the regeneration heat from the milk-cooling circuit after sterilisation. By an injector or an infuser the produce is then brought to 140–145° C. by direct transfer of latent heat from steam to produce (the produce being consequently diluted in proportion to the acquired heat). Then there is a standing period for sterilisation at the highest temperature for 3–6 seconds and subsequently the produce is introduced into a vacuum chamber where steam added during sterilisation is drawn out, by making it condense on an appropriate water-cooled surface condenser. After homogenisation of the produce at a degassing temperature of 70–80° C., the produce is definitively cooled in a heat exchanger providing water recirculation, which water is intended for pre-heating the produce at its entry.

Such a plant has the unquestionable advantage of being of simple structure and requiring washing cycles relatively spaced out in time (even 30–36 hours of uninterrupted production before washing). In addition, the sterilisation step and subsequent cooling are very quick and on coming out of the degassing device the produce has already reached the homogenisation temperature. A high precipitation of the casein and proteins however occurs both in the high-temperature section of the plant and during the final packaging.

In an attempt to obviate the above drawbacks some alternative versions to the classic technology have been proposed. For example, a pre-heating to 90° C. of the produce fed to the plant in this case too at a temperature of 4–8° C. has been suggested. This heating is advantageously carried out utilising the regeneration heat from the milk-cooling circuit after sterilisation. After a standing period for stabilisation, or stabilisation pause, aiming at reducing protein precipitation, a further indirect pre-heating at 120° C. is carried out. After that, the produce is submitted to heating at 140–145° C. by an injector or an infuser, then to a sterilisation pause at the highest temperature for 3–6 seconds and a first cooling with the heat exchanger at 100° C. After that, the produce follows the classic treatment, involving introduction of same into the vacuum chamber for drawing out the steam added during sterilisation, subsequent homogenisation at the degassing temperature of 70–80° C. and final cooling by exchanger with water recirculation which will carry out pre-heating of the produce being introduced.

While a reduction in energy consumption is achieved, on the other hand a worsening in the organoleptic qualities of the produce occurs, as well as a shorter working time between one washing and the next one (12–15 hours at most), due to the exchangers becoming quickly dirty at high operative temperatures.

A further alternative solution to this second method has been also proposed, in which degassing and homogenisation are provided to take place before sterilisation, in turn carried out with an infuser. However no important advantages exist as compared with the preceding solution. Such a solution is proposed in U.S. Pat. No. 4,310,476 and U.S. Pat. No. 4,419,301.

It is a general object of the present invention to obviate the above mentioned drawbacks by providing a process and a plant for production of milk and the like sterilised at high temperature, which enable a high organoleptic quality to be obtained together with a low cost for servicing of the plants putting this process into practice.

SUMMARY OF THE INVENTION

In view of the above object, in accordance with the invention, a process for high-temperature sterilisation of produces such as milk and the like has been devised which comprises the steps of directly injecting steam into the produce for heating it to a lower temperature than the sterilisation temperature, causing the produce to pass through an infuser for further heating it to the sterilisation temperature, keeping it to this temperature over a predetermined period of time, admitting the produce to a vacuum chamber for sudden cooling of same. A pause for a predetermined period of time may be provided between heating at a lower temperature than the sterilisation temperature and passage through the infuser.

A plant for high-temperature sterilisation of produces such as milk and the like has also been devised, which comprises a steam injector injecting steam into the produce for heating it to a lower temperature than the sterilisation temperature, an infuser further heating the produce to the sterilisation temperature, a vacuum chamber for sudden cooling of the sterilised produce, disposed in series. Also provided between the injector and infuser may be an accumulator for produce standing.

BRIEF DESCRIPTION OF THE DRAWING

For better explaining the innovative principles of the present invention and the advantages it offers over the known art, a possible embodiment applying said principles will be described hereinafter by way of non-limiting example, with the aid of the accompanying drawing consisting of one FIGURE alone.

DETAILED DESCRIPTION OF THE INVENTION

With reference to the FIGURE, a diagram of a sterilisation process in accordance with the invention is therein shown.

In accordance with this diagram, the produce is fed to a low-temperature (4–8° C.) inlet 10, drawing it from a storage vessel 20, for example. First a pre-heating to 65–85° C., preferably 70–80° C., is carried out. Pre-heating is accomplished by means of an exchanger 11, by utilising the regeneration heat from the produce-cooling circuit after sterilisation, for example.

After pre-heating, the produce is heated to 85–105° C., preferably 90–100° C., by a direct steam injection through an injector 12. Then a stabilisation pause is carried out in an accumulator 13 for produce standing, at the exit of which the produce is sent to a known infuser 14 by which it is heated to 140–145° C. with direct transfer of latent heat from steam to produce. After coming out of the infuser, the produce is submitted to a sterilisation pause at the highest temperature in an accumulator 15 for produce standing for a period of 3–90 seconds. The produce is then introduced into a vacuum chamber 19 in which steam added during sterilisation is drawn out and is allowed to condense on an appropriate water-cooled surface condenser 16. The produce coming out of the vacuum chamber is then homogenised at the degassing temperature of 70–80° C. in a known homogenizer 17 and then sent to an exchanger 18 with water recirculation for cooling to the temperature of exit from the plant. The cooling water of exchanger 18 can be advantageously employed, possibly further heated, for pre-heating the produce entering the pre-heating exchanger.

By the method of the invention, the sterilisation cycle takes place with a dual-stage heating: a first heating stage with direct steam injection and a second stage with an infuser. The first steam injection is carried out at low pressure and this does not damage the produce. Then a stabilisation pause reducing casein precipitation is provided. Infusion takes place starting from a higher temperature level (85–105° C.) than the traditional one in the known art (usually 70–80° C.) and this reduces the amount of steam necessary during infusion and enables steam pressure within the pressure tank to be reduced to the minimum necessary amount, which brings about surprising advantages in terms of produce quality and decay.

Cooling after sterilisation, which has been found to be one of the most important steps of the sterilisation technology, takes place in a substantially instantaneous manner up to 70° C.

By the process of the invention, important operating advantages are achieved in the infuser: a lower difference in temperature between the produce and the saturated steam can be maintained (whereas in the known art steam in the infusion case has a saturation pressure greater than the equivalent to the sterilisation temperature itself); a greater flow rate is obtained, the acceptable difference in temperature being the same; due to the reduced casein precipitations, a lower deposit at the bottom occurs; there is a greater stability of the produce film falling into the infuser, due to the smaller percent amount of necessary steam. In addition, exchangers work at relatively low temperatures and therefore they have a reduced tendency to get dirty.

In conclusion, by the process of the invention it has been found that the following advantages occur: limited precipitations of the produce, a greater stability of the infusion step, improved organoleptic features and reduced decay of the produce, prolonged working times before cleaning operations are required.

What is claimed is:

1. A process for high-temperature sterilization of a liquid milk-based product comprising the steps of directly injecting steam into a liquid milk-based product for heating the liquid milk-based product to a temperature lower than a sterilization temperature, causing the liquid milk-based product to pass through an infuser for further heating the liquid milk-based product to the sterilization temperature, keeping the liquid milk-based product at this temperature for a predetermined period of time, and admitting the liquid milk-based product to a vacuum chamber for sudden cooling of the liquid milk-based product.

2. A process as claimed in claim 1, wherein between the heating step by steam injection and the heating step by an infuser a pause step of 3 to 90 seconds is provided.

3. The process as claimed in claim 1, wherein said temperature lower than the sterilization temperature is included between 85 and 105° C.

4. The process as claimed in claim 1, wherein before the heating step by injection there is a pre-heating step in a heat exchanger from a temperature of about 4–8° C. to a temperature of 65–85° C.

5. The process as claimed in claim 1, wherein a pause step of 3–6 seconds is provided between coming out of the liquid milk-based product from the infuser and admission of the liquid milk-based product to the vacuum chamber.

6. The process as claimed in claim 1, wherein after the admission step to a vacuum chamber, the liquid milk-based product is homogenised to a degassing temperature of 70–80° C.

7. The process as claimed in claim 6, wherein after homogenisation the product liquid milk-based is further cooled in a heat exchanger.

8. The process as claimed in claim 3, wherein the temperature lower than the sterilization temperature is between 90–100° C.

9. The process as claimed in claim 4, wherein the pre-heating step in the heat exchanger is at a temperature of about 4 to 8° C. to a temperature of 70–80° C.

* * * * *